July 22, 1969 F. J. WOODS 3,456,579

PACKAGED FOOD DISPLAY AND HEATING DEVICE

Filed April 26, 1967 3 Sheets-Sheet 1

Francis J. Woods
INVENTOR

BY Arnold, Roylance, Kruger & Durkee
ATTORNEYS

PACKAGED FOOD DISPLAY AND HEATING DEVICE

Francis J. Woods
INVENTOR

BY Arnold, Roylance, Kruger & Durkee
ATTORNEYS

July 22, 1969 F. J. WOODS 3,456,579

PACKAGED FOOD DISPLAY AND HEATING DEVICE

Filed April 26, 1967 3 Sheets-Sheet 3

Francis J. Woods
INVENTOR

BY Arnold, Roylance, Kruger & Durkee
ATTORNEYS

United States Patent Office 3,456,579

Patented July 22, 1969

1

3,456,579

PACKAGED FOOD DISPLAY AND HEATING DEVICE

Francis J. Woods, 2509 E. Martha Lane, Pasadena, Tex. 77502

Filed Apr. 26, 1967, Ser. No. 633,742
Int. Cl. A47j *37/04*; B65b *55/14*
U.S. Cl. 99—341 13 Claims

ABSTRACT OF THE DISCLOSURE

The present invention relates to apparatus for heating food packages, maintaining such food packages at a desired temperature, and for displaying such food packages for customer self-service without radiating excessive heat. An infrared heating lamp and a reflector, positioned behind the lamp, direct radiant heat energy toward a slowly rotating drum to which the food packages are attached. The food packages are held angularly to a tangential line through the drum's surface, thus facilitating the uniform heating of both sides of the package. A friction drive mechanism allows the drum to be stopped for removing food packages without overloading the drive motor.

BACKGROUND OF THE INVENTION

Field of the invention

This invention relates to apparatus suitable for displaying and heating food packages enveloped in cellophane, aluminum foil, or soft or hard film plastics. More specifically, this invention pertains to uniformly heating such food packages, maintaining them at such a uniform temperature and to display them for convenient customer self-service.

Description of the prior art

There is a need for a simple, reliable heating and display unit to attractively display various packaged food items offered for sale and to simultaneously heat and maintain them at a desired temperature to enhance their flavor and palatability. Many taverns, beer parlors, and snack bars do not have kitchen facilities, but their customers demand immediate hot food service. The same is true of establishments such as drive-in grocery stores that wish to provide hot food service for packaged foods that are simple to prepare and appeal to those customers who have limited time for meal preparation. Often a company will provide a small snack bar for its employees for coffee and lunch breaks and yet would like to offer hot foods without investing in kitchen facilities.

Presently, it is common for lunch counters and snack bars to offer packaged foods such as sandwiches, hot dogs, hamburgers, tamales, sausage links, sweet rolls, and fried pies. If the customer wants such foods warmed, it must be unpackaged and placed in an oven or cooker to be heated. This results in a delay for the customer who must wait and an inefficient use of the oven or cooker by the establishment. Such ovens or cookers are not designed to heat packaged foods but only unprepared or unpackaged foods.

Devices previously designed and presently being used for heating and displaying packaged foods suffer from several disadvantages. One widely used device is rectangular in shape, having a single glass door in the front and metal enclosed sides and top, severely limiting its display value. This type of device also has a limited storage capacity since the packaged food items must lie flat on the shelves provided, wasting space and further reducing the display value of the unit. This device utilizes fixed heating elements such as electric light bulbs or heated coil elements.

2

The type of device with its heating element fixed with respect to the packaged food storage and display racks heats the inside of the device to the desired 130° F.–160° F. range, but it does not distribute the radiated heat evenly. Some of the walls, shelves, and packages will be heated to a higher temperature than other adjacent walls, shelves, and packages, thus tending to heat the packaged food items unevenly. Such uneven heating of the packaged food items tends to dry out the excessively heated portion and to drive the moisture in the packaged food to the less heated portion.

Another type of device used is the oversized electric roaster, either with a solid lid, thereby having no display capability, or a glass lid, having a limited display capability. Constant opening and closing of the glass lid causes condensation to form on the inside of the glass further reducing its display capability.

Without proper heat regulation, the roaster type of device will damage the food items at a high heating ranges. Another limitation of this device is that in order to maintain a 130° F.–160° F. heating temperature, the bottom and sides must reach a much higher temperature. This high temperature can cause damage to certain types of packaging materials.

Of course, there are a number of devices that display foods only, but they are not adequate for displaying hot foods since such foods must be maintained at a predetermined temperature range. There are several rotisserie cooking devices presently in use, but they do not provide a display capability and their temperatures are too high for heating packaged foods, since they were designed to cook raw or unprepared foods.

Improved heating and display devices were designed with a plurality of heating elements that more uniformly spread the heat distribution throughout the device. However, since the heating elements are fixed in relation to the walls, storage shelves, and the food packages, the problem of uneven heating of the packages is not substantially eliminated. Those surfaces receiving direct heat radiation are heated to higher temperatures than other surfaces. The metal trays and racks shield a portion of the packages that they hold, further causing uneven heating. This shielding is compensated for somewhat by a small amount of heat radiated from the shelves and walls to the packaged food. However, the heating caused by direct radiation from the heating element will be much greater than the radiation from the walls and shelves. Since the heating is constant, one surface of the package will remain at a higher constant temperature than the other surfaces.

Such uneven heating will be maintained until the package is removed or its position changed. The former defeats the purpose since the object is to uniformly heat the package prior to removal. The latter is undesirable because of the inconvenience to operating personnel and to customers when self-service is provided.

Another type of device often used is a metal enclosed container having several drawers that slide out to provide display for selection purposes. This type of device has no display capability and is not as well suited to customer self-service as a device that allows unimpeded customer examination of the packaged food items for sale. It suffers from the same drawbacks of uneven heating and drying of the packaged foods.

Any device that does not have a maximum display capability will not take advantage of the "impulse buyer" who purchases an item because he has just seen it and it strikes his fancy, rather than because he had a predetermined desire to buy the item. As is well known to retailers in the grocery and packaged food lines, "impulse buying" can be a large percentage of total sales if selected goods are properly and attractively displayed in areas where there is heavy customer traffic.

SUMMARY OF THE INVENTION

The present invention overcomes the deficiencies of presently used heating and display devices by providing a novel combination of heating and display means in one device. Accordingly, it is a feature of the present invention to provide a novel combination display and heating device that constantly moves the packaged food items in relation to the heating means, thus maintaining a constant temperature and a balanced moisture content throughout the food package.

It is another feature of the present invention to provide a novel combination display and heating device that can accommodate a variety of food packages without damaging the packaging material during the heating process.

Another feature of the present invention is its ability to handle a variety of types of packages of differing sizes and shapes by means of an overlapping or nesting feature provided by its package holding means.

It is another feature of the present invention to provide an open customer-accessible display and storage means to maximize display capability and appeal to "impulse buyers."

Yet another feature of the present invention is the ability of the combination display and heating device to provide adequate heating for food packages in the range of 130° F.–160° F., and yet to have one side of the device completely open to allow the customer a self-service capability.

It is another feature of the present invention to allow the rotating display and storage means to be easily stopped by the customer to make a selection, and then to immediately resume movement when released.

Generally, in the present invention, some or all of these advantages are attained by use of a drum rotatable around a vertical axis, the drum being centered between two triangular frames, one above and one below, a reflector enclosing two sides of the triangular frames, and an infrared lamp as a heating means. The rotatable drum has clips or hooks, as desired, from which the food packages are suspended. The clips or hooks extend outwardly at an angle from the drum surface, allowing the packages to overlap and nest with the adjoining packages. This overlapping increases the capacity of the drum and enables it to hold more packaged items than if the packages hung side by side.

The drum is rotatably mounted on a vertical shaft through its longitudinal axis. Secured to the shaft is a flanged drum plate whose upper surface makes frictional contact with a flange plate surface of the drum. A motor and gearbox coupled to the shaft rotate the shaft and attached drive plate, which in turn rotates the drum through the frictional engagement of the drive plate with the flanged plate of the drum.

A reflector extends between the top and base members to close substantially two sides of the display and heating device. The third side, facing the front, is left open for maximum display advantage. The sides of the reflector are trapezoidal in configuration with the wider end at the top and the narrower end at the bottom, leaving the sides more open at the base than at the top.

An infrared lamp is used as the heat source and is located between the reflector sides at a location adjacent the back of the drum. In operation, the heat rays from the infrared lamp are directed at the food packages suspended angularly on the rotating drum. Since the surface of the drum, reflector sides, and top and base members are of a heat reflective material, the heat rays reflected from them are dispersed and concentrated in the general area of the rotating drum to reach a temperature of at least 130° F. The packaged foods are heated first primarily on one side; then as they turn on the rotating drum with respect to the infrared heating source, they are heated on the other side until complete and uniform coverage is obtained. The moisture balance of the food item and the desired constant temperature is maintained, keeping the food items in good condition for several hours.

The drum may be stopped simply by grasping a food package holding bracket, since the shaft and attached drive plate will continue to turn as the friction clutch action between the drive plate and drum flange plate surface is overcome. As soon as the bracket member is released, the drum will resume its rotation.

BRIEF DESCRIPTION OF THE DRAWINGS

In order that the manner in which the above-recited advantages and objects of the invention are attained, as well as others which will become apparent, can be understood in detail, more particular description of the invention may be had by reference to the embodiments thereof which are illustrated in the appended drawings, which drawings form a part of this specification. It is to be noted, however, that the appended drawings illustrate only typical embodiments of the invention and therefore are not to be considered limiting of its scope, for the invention may admit to other equally effective embodiments.

In the drawings:

FIGURE 1 is a detailed cross-sectional view of the mounting of the infrared lamp and longitudinal reflector in the real recess of the embodiment shown in FIGURE 8.

DESCRIPTION OF THE PREFERRED EMBODIMENTS

Figures 1, 2:
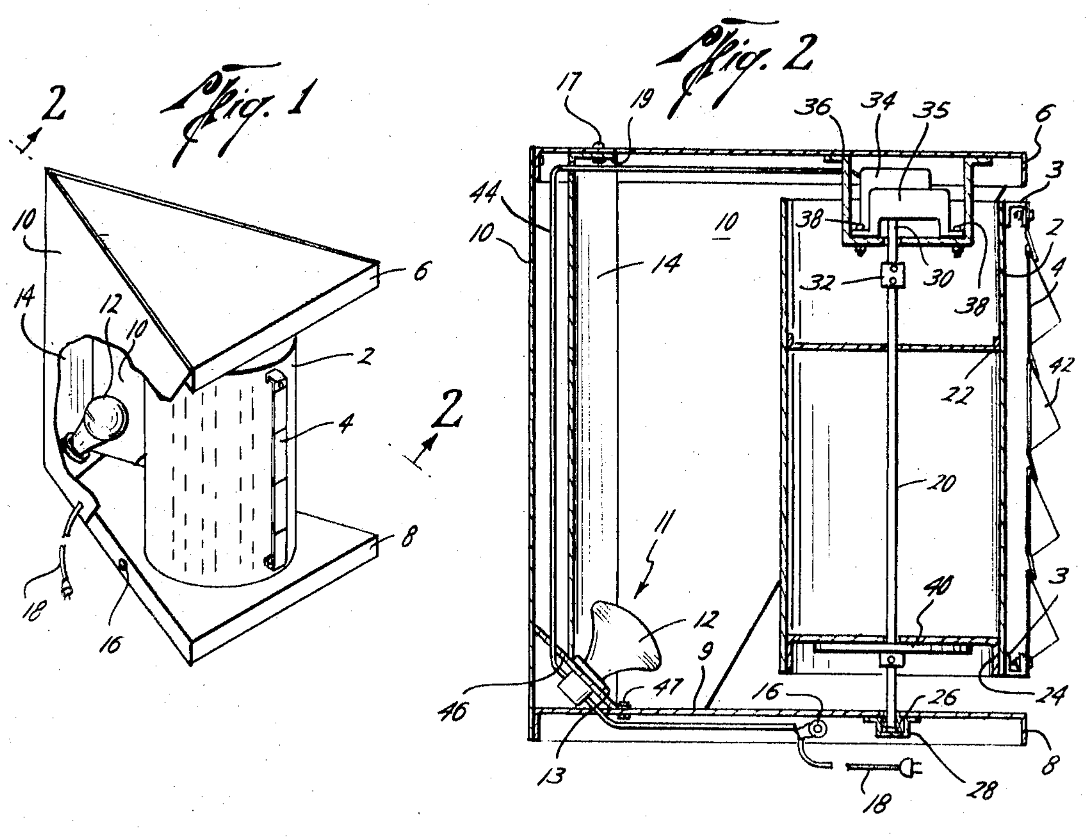
FIGURE 1 is a pictorial view showing the major components of a preferred embodiment of the present invention.
FIGURE 2 is a vertical cross-sectional view of the preferred embodiment shown in FIGURE 1.

Referring now to the drawings and first to FIGURE 1, the preferred embodiment of the present invention is illustrated. Drum 2, having clip brackets 4 attached to its exterior surface, is rotatably mounted between top frame 6 and base frame 8, which are spaced apart and supported by a reflector 10, having two trapezoidal shaped sides. The top edge of each side of reflector 10 is wider than the bottom edge, leaving a larger open space at the bottom of the packaged food display and heating device than at the top.

Infrared lamp 12 is located in the recess of the intersection of the sides of reflector 10 and is mounted in front of longitudinal reflector 14 to direct its rays upon drum 2. Switch 16 and electrical outlet plug 18 are located on one side of base frame 8.

The detail cross-sectional view of a preferred embodiment of the invention taken at section 2—2 of FIGURE 1 is shown in FIGURE 2. Drum 2 with externally mounted clip brackets 4 is rotatably mounted between top frame 6 and base frame 8. Drum shaft 20 passes through the longitudinal axis of drum 2 and is centered within drum 2 by means of flange 22 and flange plate 24. The lower end of shaft 20 passes through an opening in base frame floor 9 and is inserted in shaft bearing 26 housed in shaft bearing bracket 28. Bracket 28 is attached to the underside of base frame floor 9.

Drum shaft 20 is coupled to gearbox shaft 30 by means of removable coupling 32. Motor 34 and reduction gearbox 35 are mounted inside the top frame 6 by means of a bracket 36 and conventional mounting bolts 38. Brackets 28 and 36 are suitably secured to base frame 8 and top frame 6, respectively, by any suitable attaching means such as brazing, welding, riveting, or bolting. Similarly, flange 22 and flange plate 24 may be suitably secured within drum 2.

Friction drive plate 40 is removably attached to drum shaft 20 and fixed in such a position that its drive surface contacts flange plate 24 and thereby supports drum 2 in its desired, generally centered location. Motor 34 and reduction gearbox 35 rotate shaft 20 and attached friction drive plate 40 at a slow rate of speed on the order of 3–4 revolutions per minute. The weight of drum 2 and the food packages 42 force flange plate 24 into frictional engagement with friction drive plate 40, thus rotating drum 2 and its attached food packages 42. Drum 2 may be stopped at any position to remove a food package 42 by simply stopping the motion of drum 2, since the friction drive plate 40 will continue to turn and slip with respect to the now stationary flange plate 24. This arrangement allows the rotating drum 2 to be stopped at any time to remove a food package 42 from clip bracket 4 without having to employ a braking mechanism, or an elaborate decoupling mechanism between friction drive plate 40 and flange plate 24. Without such a friction drive mechanism, motor 34 would have to be stopped when drum 2 was stopped or run the risk of overloading and damaging the motor.

This heating and display apparatus could be on any convenient size so long as the essential features of the present invention are incorporated. The preferred embodiment contemplates a light-weight, portable device approximately 26 inches high with a drum size of approximately 15 inches. This would enable the device to hold approximately thirty to forty food packages, depending on their size, and still be compact enough to sit on the top of a table or counter for customer self-service.

Infrared lamp 12 is located in the bottom of rear recess 11 at the intersection of the sides of reflector 10 and base frame 8. Socket 13 of lamp 12 is attached to a triangular-shaped bracket 46 mounted in the bottom of rear recess 11. Longitudinal reflector 14 is mounted in the V-shaped rear recess 11 to facilitate forward reflection of heat rays that would become scattered and diffused in the angular intersection of the sides of reflector 10 in the rear recess 11. Wiring cable 44 provides simple two-wire electrical connection between motor 34, infrared lamp 12, switch 16, and outlet plug 18.

Figures 3, 4:
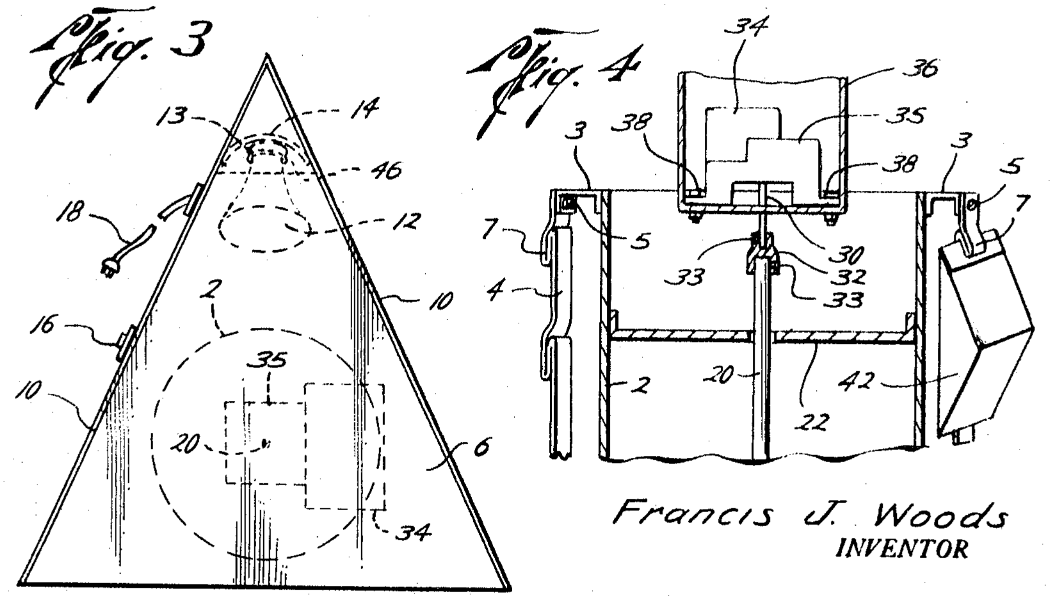
FIGURE 3 is a partial top elevation of the preferred embodiment shown in FIGURE 1.
FIGURE 4 is a detail cross-sectional view of the motor, gearbox, drum shaft, and upper portion of the drum shown in FIGURE 2.

A top partial elevation of the embodiment shown in FIGURE 2 is represented in FIGURE 3. Drum 2 is shown in its general central location between the sides of reflector 10 and forward of the center of the triangular top frame 6 and base frame 8. Longitudinal reflector 14 is shown positioned in the rear recess 11 of reflector 10 with socket 13 of lamp 12 fixed to bracket 46.

As can be seen in FIGURE 3, the radiant heat from infrared lamp 12 falls directly on rotating drum 2 and food packages 42. Heat radiated to the sides is redirected toward drum 2 and the front of the device by the angular sides of reflector 10. The heat reflected from the sides of reflector 10 and drum 2 is scattered between and behind the packages, thus uniformly heating all sides of food packages 42. Of course, reflector 10 could be of a horizontally curved configuration, or any other configuration consistent with reflecting side radiated heat from the heat source toward the moving food packages.

FIGURE 4 is a detailed cross-sectional view of the mounting of motor 34 and gearbox 35, drum shaft 20, and the upper portion of the drum 2 with attached holding brackets 4 is shown in FIGURE 2. Drum shaft 20 is shown positioned through the longitudinal axis of drum 2 and laterally centered by flange 22. Drum shaft 20 is coupled to gearbox shaft 30 by coupling 32 and conventional set screws 33. Motor 34 and reduction gearbox 35 are shown conventionally mounted to bracket 36 with bolts 38.

Clip bracket 4 is attached to angle brackets 3, at the top and bottom of the drum 2 (see FIGURES 4 and 5), by conventional bolts 5. Clip bracket 4 contains several holding clips 7 to grasp and hold food packages 42.

Figure 5:
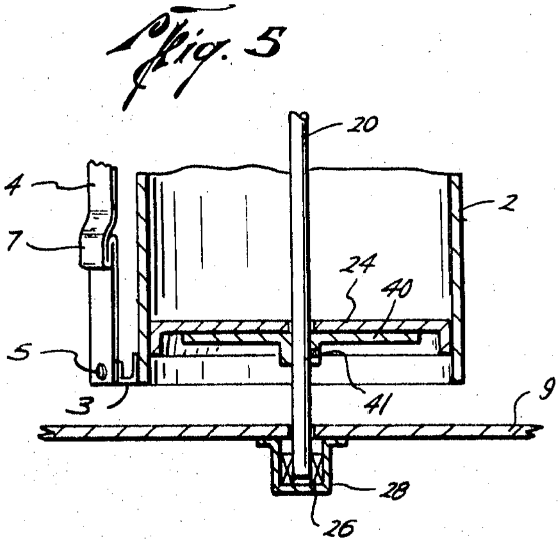
FIGURE 5 is a detail cross-sectional view of the drum shaft, lower portion of the drum, shaft bearing, and the friction drive plate shown in FIGURE 2.

In FIGURE 5, a detailed cross-sectional view of the lower drum shaft 20 and drum 2, shaft bearing 26, and the friction drive plate 40 is provided. Drum shaft 20 is shown passing through flange plate 24 of drum 2 and base frame floor 9 of base frame 8, to be inserted in shaft bearing 26. Shaft bearing 26 and drum shaft 20 are supported by shaft bearing bracket 28. Friction drive plate 40 is conventionally secured to drum shaft 20 in friction-engaging contact with the lower surface of flange plate 24 of drum 2 by set screw 41. Clip bracket 4, with holding clips 7, is conventionally secured to angle bracket 3 by means of bolt 5. Angle bracket 3 is fixed to the exterior surface of drum 2 by any suitable attaching means.

Figure 6:
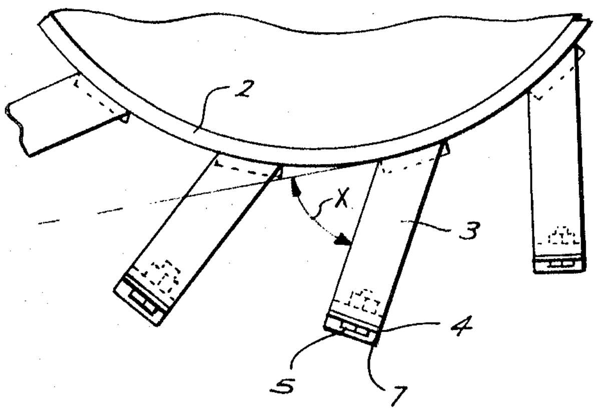
FIGURE 6 is a detail top view of a portion of the drum showing the clip-holding brackets.

A detailed top view of angle brackets 3 with clip brackets attached are shown in FIGURE 6. Angle brackets 3 extend outwardly from a tangent to the exterior surface of drum 2 at an angle X to facilitate the overlapping and nesting of food packages 42. Angle X may be any convenient angle that allows maximum overlapping consistent with the holding capability of drum 2 and provides sufficient opening between food packages 42 for the entry of reflecting heat energy.

Figure 7:
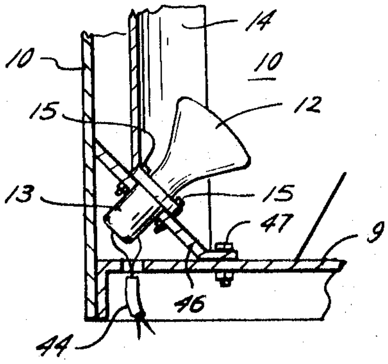
FIGURE 7 is a detail view of the mounting of the infrared lamp in the rear bottom recess of the preferred embodiment of the invention.

In FIGURE 7, infrared lamp 12 and its socket 13 are conventionally attached to lamp socket mounting bracket 46 by bolts 15. Bracket 46 is located in the lower corner of rear recess 11 where the V-shaped sides of reflector 10 intersect the base frame floor 9 of base frame 8. Flange 47 of bracket 46 is conventionally fastened to base frame floor 9 by means of bolt 48. Cable 44 passes through an opening in base frame floor 9 to facilitate wiring of lamp 12. Bolts 17 through top and bottom flanges 19 conventionally secure reflector 14 to top frame 6 and base frame 8, holding it in a vertical position in the rear recess 11. It should be noted, of course, that reflector 14 can be of any convenient shape and position within the rear recess 11 of reflector 10 so long as it is capable of reflecting heat energy forward toward the drum that would otherwise be dissipated in the narrow rear recess 11.

The infrared lamp 12 can be of any convenient rating consistent with the desired heating requirements of the device and depending on the type of food to be heated. The embodiment above described uses an infrared lamp of 250 watts to maintain at least a temperature of 130° F.

Figure 8:
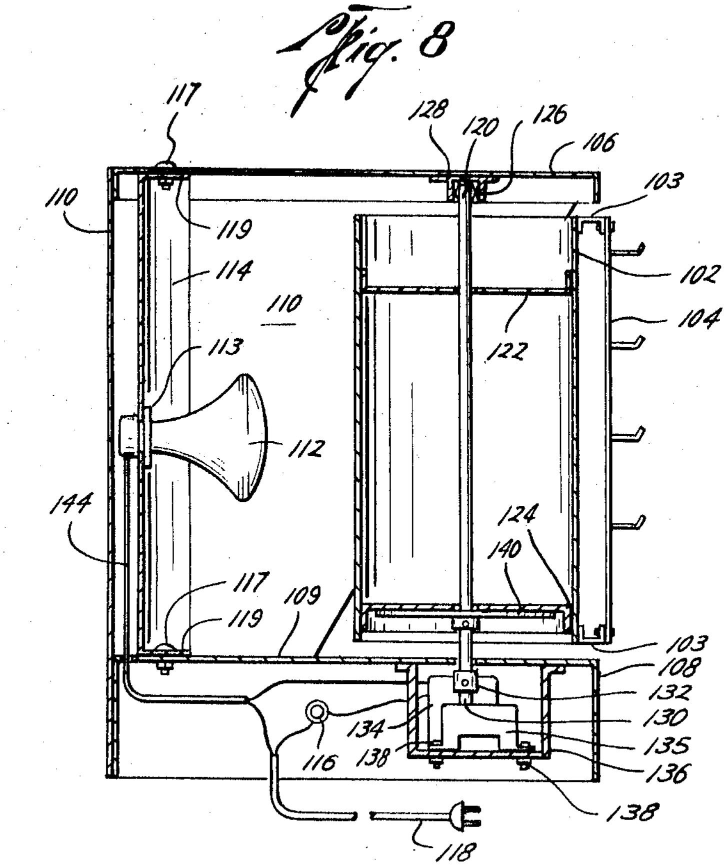
FIGURE 8 is a vertical cross-sectional view of another embodiment of the present invention.

FIGURE 8 shows a detail cross section of another embodiment of the present invention. Drum 102, with externally mounted hook brackets 104, is rotatably mounted between top frame 106 and base frame 108. Drum shaft 120 passes through the longitudinal axis of drum 102 and is centered within drum 102 by means of flange 122 and flange plate 124. The upper end of shaft 120 passes through an opening in shaft bearing bracket 128 and is inserted in bearing 126. Bracket 128 is fixed to the inside of top frame 106 by any suitable attaching means. Similarly, flange 122 and flange plate 124 may be suitably fixed within drum 102 by any suitable conventional attaching means.

Shaft 120 is coupled to gearbox shaft 130 by means of removable coupling 132. Motor 134 and reduction gearbox 135 are conventionally mounted inside base frame 108 by means of mounting bracket 136 and bolts 138. Bracket 136 is fixed to base frame 108 by any suitable conventional attaching means.

Friction drive plate 140 is removably attached to shaft 120 and fixed in such a position that its drive surface contacts flange plate 124 and supports drum 102 in its desired generally centered location. The method of driving drum 102 by frictional contact between flange plate 124 and friction drive plate 140 is identical to that described earlier in the description of the preferred embodiment. Likewise, the feature of stopping the rotation of drum 102 by hand is identical to that described earlier in the discussion of the preferred embodiment.

Infrared lamp 112 is located in the rear recess 111 of the intersection of the sides of reflector 110. The socket 113 of lamp 112 is attached to the longitudinal reflector 114 mounted in the V-shaped rear recess 111 of the sides of the reflector 110, to facilitate forward reflection of heat rays that would become scattered and diffused in the narrow angular rear recess 111. Cable 144 provides simple two-wire electrical connection between motor 134, infrared lamp 112, switch 116, and outlet plug 118.

Figure 9:
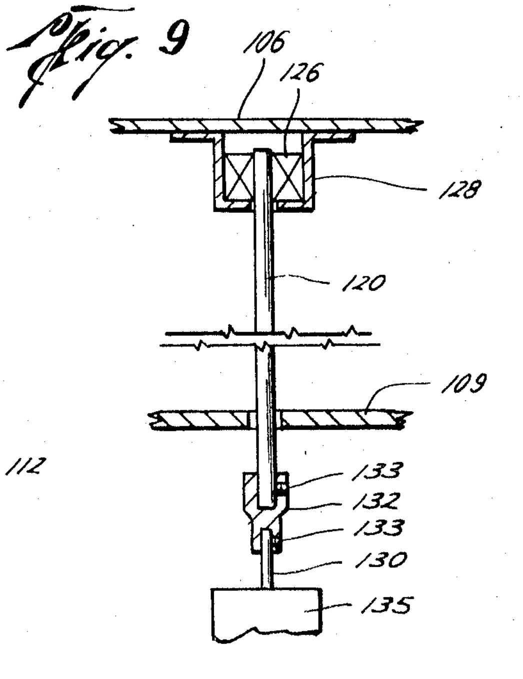
FIGURE 9 is a detailed view of the shaft bearing and mounting bracket and coupling between the gearbox shaft and the drum shaft of the embodiment shown in FIGURE 8.

A detailed cross-sectional view of the drum shaft bearing 126, shaft bearing mounting bracket 128, and the coupling 132 between the drum shaft 120 and the gearbox shaft 130 is shown in FIGURE 9. The upper end of drum shaft 120 is inserted through a hole in bearing mounting bracket 128 and into shaft bearing 126. Drum shaft 120 is conventionally coupled to gearbox shaft 130 by means of coupling 132 and set screws 133.

Figure 10:
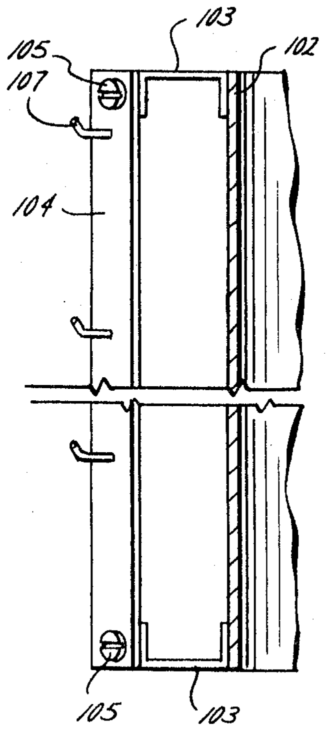
FIGURE 10 is a detailed side view of the hook-holding bracket shown in the embodiment of FIGURE 8.

The fastening of hook bracket 104 of the embodiment shown in FIGURE 8 to the angle brackets 103 is illustrated in FIGURE 10. Hook bracket 104 is of the identical dimensions of clip bracket 4 of the preferred embodiment illustrated earlier in FIGURES 4 and 5, and is interchangeable with clip bracket 4 since the angle bracket 103 of this embodiment is identical with angle bracket 3 discussed earlier in the preferred embodiment and illustrated in FIGURES 4, 5, and 6. Hook bracket 104 had extended, upwardly bent hooks 107 that facilitate the holding of packaged food items that have pre-punched holes to be used for such hanging purposes. Hook bracket 104 is attached to angle brackets 103 by means of bolts 105. Of course, many other types of hanging devices could be utilized in place of clips or hooks so long as they accomplish the same purpose of holding the food packages angularly to the drum surface for uniform heating.

Figure 11:
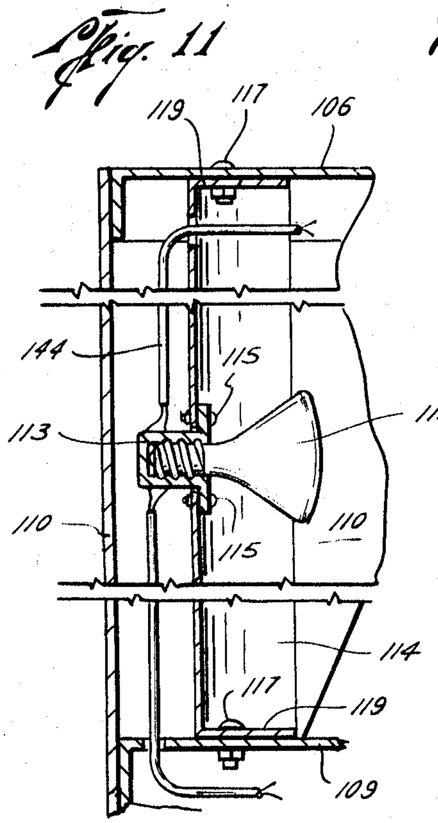

In FIGURE 11, infrared lamp 112 is shown with its socket 113 conventionally attached to longitudinal reflector 114 by means of bolts 115. Longitudinal reflector 114 and attached socket 113 are positioned in the rear recess 111 of the V-shaped angle formed by the intersecting sides of reflector 110. Bolts 117 through top and bottom flanges 119 conventionally secure reflector 114 to top frame 106 and base frame 108, holding it in a vertical position in the rear recess 111. It should be noted, of course, that reflector 114 can be of any convenient shape and positioned within the rear recess 111 of reflector 110 so long as it is capable of reflecting heat energy forward toward the drum that would otherwise be dissipated in the narrow rear recess 111.

Figure 12:
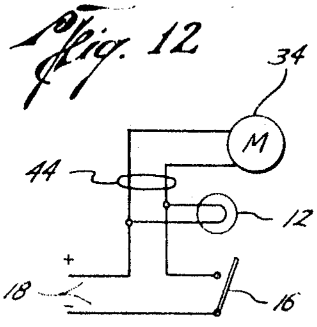
FIGURE 12 is a simplified wiring diagram of the embodiments shown in FIGURES 2 and 8.

FIGURE 12 shows a simplified wiring diagram utilized in the illustrated embodiments of the present invention. Outlet plug 18 uses a standard two-wire cord. One wire is connected to one terminal of the single-pole, single-throw switch 16, and one wire is connected to one terminal of lamp 12 and motor 34, through wiring cable 44. The second wire of cable 44 connects the second terminal of motor 34 and the other terminal of lamp 12 to the other terminal of switch 16. When switch 16 is closed, the electrical circuit from the power source is completed, energizing motor 34 and infrared lamp 12. Likewise, when switch 16 is opened, motor 34 and infrared lamp 12 are turned off.

The reflective materials of which drum 2 and 102, top frame 6 and 106, base frame 8 and 108, two-sided reflector 10 and 110, and longitudinal reflector 14 and 114 are constructed can be of any suitable reflecting material such as polished aluminum, stainless steel or any material having a highly polished reflective finish. Polished aluminum is recommended because of its light weight coupled with great strength and rigidity.

I claim:

1. A combination heating and display apparatus for packaged foods comprising:
- a housing having an open side for display and access;
- a drum of reflective material vertically oriented and rotatably mounted within said housing and adjacent said open side;
- driving means for rotatably driving said drum;
- heating means within said housing for directing radiant heat energy upon said drum;
- reflecting means within said housing for directing radiant heat energy from said heating means toward said drum; and
- hanging means attached to said drum for holding food packages to uniformly heat all surfaces upon rotation of said drum.

2. A combination heating and display apparatus for packaged foods as described in claim 1, wherein:
- said drum is axially and rotatably mounted on a rotatable vertical shaft mounted within said housing; and
- said driving means includes a motor and gearbox coupled to one end of said vertical shaft rotatably driving said shaft and drum.

3. A combination heating and display apparatus for packaged foods as described in claim 2, wherein:
- said heating means is an infrared lamp; and
- said reflecting means is a V-shaped two-sided reflector mounted rearwardly of said infrared lamp with the open end of said V-shape oriented toward said drum.

4. A combination heating and display apparatus for packaged foods as described in claim 3, wherein:
- said drum has an internal flanged member with a friction engaging surface, said flanged member rotating axially of said vertical shaft;
- said vertical shaft has an attached friction drive member whose friction surface is engagingly oriented to make frictional engagement with said surface of said flanged member; and
- said frictional engagement of said surfaces causes rotation of said drum as said vertical shaft is rotatably driven by said motor and gearbox.

5. A combination heating and display apparatus for packaged foods as described in claim 1, wherein said hanging means includes bracket members containing a plurality of hanging devices secured to the exterior of said drum.

6. A combination heating and display apparatus for packaged foods comprising:
- a housing having an open side for display and access and a top and base member in a spaced apart relation to each other;
- a vertical shaft rotatably mounted between said top and base members;
- a drum member of reflective material axially and rotatably mounted on said vertical shaft;
- driving means for rotatably driving said drum;
- heating means within said housing for directing radiant heat energy upon said drum;
- reflecting means within said housing for directing radiant heat energy from said heating means toward said drum, said reflecting means spacing said top and base members in parallel relation to each other; and
- hanging means attached to said drum for holding food packages to uniformly heat all surfaces upon rotation of said drum.

7. A combination heating and display apparatus for packaged foods as described in claim 6, wherein:
  said housing includes triangular base and top members of reflective material; and
  said reflecting means includes a V-shaped reflector having two sides of trapezoidal configuration, the major parallel sides of which are attached to the top member and the minor parallel sides of which are attached to the base member partially enclosing two sides between said top and base members and leaving the third side open.

8. A combination heating and display apparatus for packaged foods as described in claim 7, wherein:
  said drum has an internal flanged member with a friction engaging surface, said flanged member rotating axially of said vertical shaft;
  said vertical shaft has an attached friction drive member whose friction surface is engagingly oriented to make frictional engagement with said surface of said flanged member; and
  said frictional engagement of said surfaces causes rotation of said drum as said vertical shaft is rotatably driven by said motor and gearbox.

9. A combination heating and display apparatus for packaged foods as described in claim 8, wherein:
  said heating means is an infrared lamp; and
  said reflecting means includes a V-shaped two-sided reflector member mounted rearwardly of said infrared lamp with the open end of said V-shape oriented toward said drum and said open end of said housing, and a curved longitudinal reflector located in the vertical V-shaped recess of the reflector member.

10. A combination heating and display apparatus for packaged foods as described in claim 6, wherein said hanging means includes bracket members containing a plurality of hanging devices secured to the exterior of said drum.

11. A combination heating and display apparatus for packaged foods comprising:
  a triangular base member of reflective material;
  a triangular top member of reflective material;
  a vertical shaft rotatably mounted between said top and base members and having an attached friction drive member with a friction engaging surface;
  a cylindrical drum of reflective material axially and rotatably mounted on said vertical shaft, and having an internal flanged member with a friction surface engagingly oriented to make frictional engagement with said surface of said friction drive member;
  a motor and gearbox rotatably driving one end of said vertical shaft and rotating said drum through the frictional engagement of the surfaces of said friction drive member and said flanged member;
  an infrared lamp located between said top and base members and oriented to direct radiant heat energy upon said drum;
  a reflecting member having a V-shaped cross section and two sides of trapezoidal configuration, the major end of said trapezoidal sides fixed to said top member, the minor end of said trapezoidal sides fixed to said base member, said reflecting member spacing the top and base members in relation to each other leaving one side open for display and access, said reflecting member directing radiant heat energy from said infrared lamp toward said drum;
  a longitudinal reflector having a convex reflecting surface and secured in the vertical longitudinal V-shaped recess of the reflecting member;
  an outlet plug and cable to supply electrical energy to said motor and infrared lamp;
  a switch to control the application of electrical energy to said motor and infrared lamp;
  a switch to control the application of electrical power to said motor and infrared lamp; and
  bracket members secured to the exterior of said drum having a plurality of hanging devices for holding food packages to uniformly heat all surfaces upon rotation of said drum.

12. A combination heating and display apparatus as described in claim 11, wherein said bracket members project angularly from the surface of said drum and include spring clips to hold packaged food items.

13. A combination heating and display apparatus as described in claim 11, wherein said bracket members project angularly from the surface of said drum and include hooks to hold packaged food items.

References Cited

UNITED STATES PATENTS

| | | | |
|---|---|---|---|
| 1,762,035 | 6/1930 | Soylian. | |
| 2,049,481 | 8/1936 | Walterspiel | 99—341 XR |
| 2,132,928 | 10/1938 | Blanchard | 211—1.5 XR |
| 2,565,786 | 8/1951 | Spartalis | 99—421 |
| 2,621,429 | 12/1952 | Teich | 211—163 XR |
| 2,945,598 | 7/1960 | Rallis | 99—443 XR |
| 3,221,638 | 12/1965 | Wickenberg | 99—393 XR |
| 3,339,477 | 9/1967 | Wilson | 99—341 |

BILLY J. WILHITE, Primary Examiner

U.S. Cl. X.R.

99—386, 393, 401, 423, 443, 447, 448; 211—163; 219—388